United States Patent

[11] 3,588,691

| [72] | Inventor | Heinrich Detsch |
| | | Planegg, Germany |
| [21] | Appl. No. | 668,451 |
| [22] | Filed | Sept. 18, 1967 |
| [45] | Patented | June 28, 1971 |
| [73] | Assignee | Siemens Aktiengesellschaft |
| | | Berlin and Munich, Germany |
| [32] | Priority | Sept. 23, 1966 |
| [33] | | Germany |
| [31] | | S 106080 |

[54] CIRCUIT ARRANGEMENT WITH FREQUENCY COMPENSATION FOR ATTENUATION AND AMPLIFICATION MEASUREMENT ON ELECTRICAL QUADRUPOLES
5 Claims, 3 Drawing Figs.

[52] U.S. Cl............................................. 324/57,
333/81
[51] Int. Cl................................................. G01c 27/00
[50] Field of Search............................................ 324/57, 58
(A), 57 (NBC), 57 (A), 585 (A); 333/81, 81 (A);
338/216

[56] References Cited
UNITED STATES PATENTS

| 1,905,353 | 4/1933 | Potter....................... | 324/57X |
| 2,324,215 | 7/1943 | Kinsburg..................... | 324/57 |
| 2,429,401 | 10/1947 | Davis.......................... | 333/81 |
| 2,667,622 | 1/1954 | Weber et al. ................. | 333/81 |
| 2,755,436 | 7/1956 | Heinz........................... | 324/57 |
| 3,243,699 | 3/1966 | Kummer...................... | 324/57 |
| 3,394,305 | 7/1968 | Robinson .................... | 324/57 |
| 2,529,436 | 11/1950 | Weber et al. ................. | 331/81 |
| 2,532,817 | 12/1950 | Lafferty et al. ............... | 324/58.5 |

Primary Examiner—Edward E. Kubasiewicz
Attorneys—Hill and Hill and Hill, Sherman, Meroni, Gross and Simpson ABSTRACT: A circuit arrangement for attenuation and amplification measurements on electrical four-terminal networks and the like employing the comparative method, wherein a signal generator having a measuring voltage of constant amplitude and a voltage measuring device can be operatively connected to a measuring branch containing the object to be measured and to a comparison branch containing a precision calibration circuit, in which attenuation means is disposed in the branch not containing the calibration circuit, whose attenuation characteristic responsive to the measuring frequency corresponds to the attenuation characteristic of the precision calibrating circuit when in the zero attenuation position.

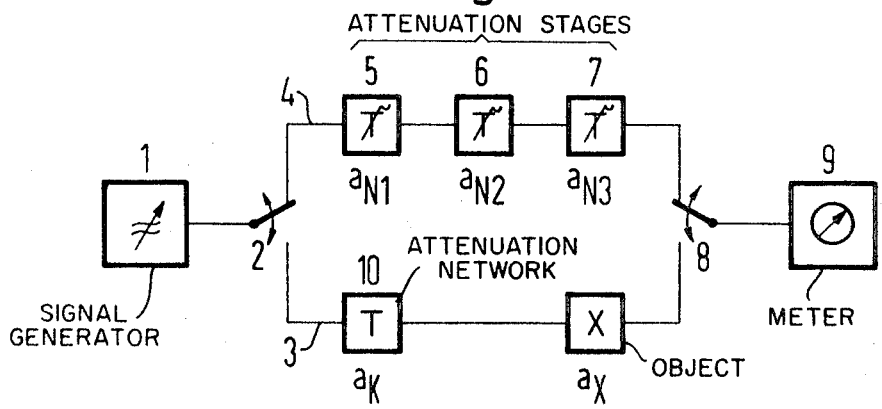
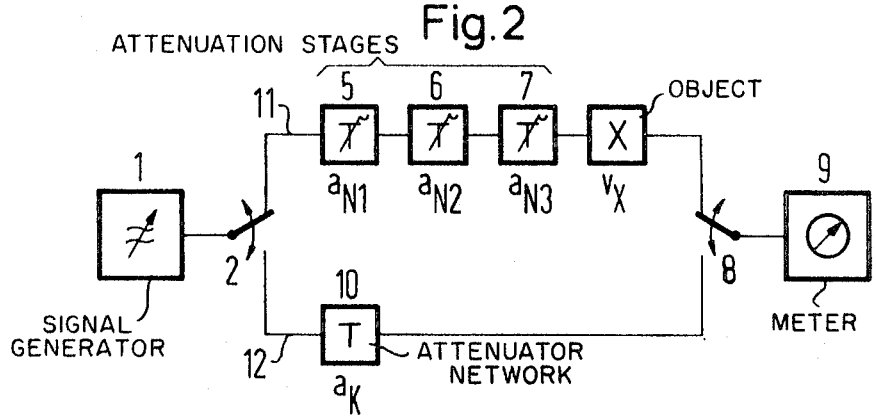
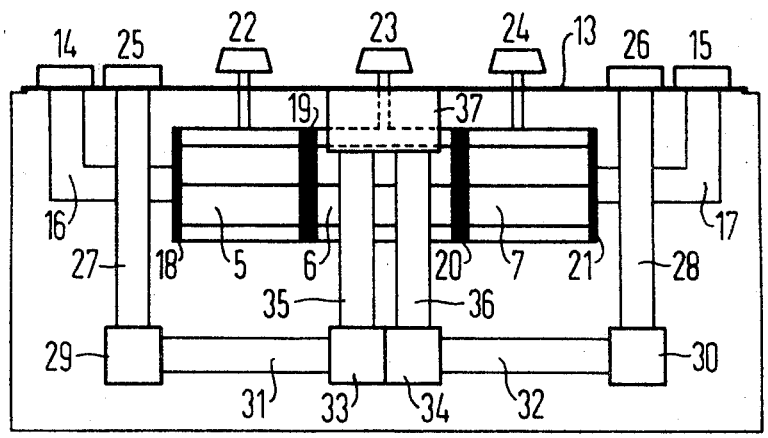

3,588,691

1

CIRCUIT ARRANGEMENT WITH FREQUENCY COMPENSATION FOR ATTENUATION AND AMPLIFICATION MEASUREMENT ON ELECTRICAL QUADRUPOLES

The invention relates to a circuit arrangement for attenuation amplification measurements on electrical four-terminal networks and the like utilizing the comparative method, wherein a signal generator having a measuring voltage of constant amplitude and a cooperable voltmeter can be connected to a measuring branch containing the object to be measured and to a comparison branch, and wherein a precision calibration circuit arranged in one of the branches is so adjusted that the voltmeter measures the same output voltage in each branch.

Thus, it is possible to operatively connect the signal generator as well as the voltmeter alternately to the measuring branch or to the comparison branch by means of switches and to carry out a separate voltage measurement for each switch position or to connect both branches in parallel to the signal generator and to the voltmeter and to effect a measurement of the difference between both output voltages. In the first instance, one balances to equal output voltage values for both switch positions, while in the latter case one adjusts to a minimum differential voltage.

The precision calibration circuit is to be understood as an arrangement with a plurality of four-terminal attenuation networks whose attenuation values are graduated with respect to one another according to magnitude and can be arbitrarily combined with one another by means of switches whereby, by suitable adjustment, a desired cumulative attenuation can be set with a high degree of accuracy and constancy. However, the ohmic resistances of the individual switches and the connection lines arranged between the four-terminal attenuation networks produce an inherent attenuation which is frequency sensitive and which superimposes upon the attenuation values which have been set. The frequency response of this inherent attenuation renders necessary that, in order to take full advantage of the accuracy of the precision calibration circuit, the value of the inherent attenuation must be plotted in calibration curves or calibration tables as a function of the measuring frequency and utilized to correct the actual measured results. This, however, is complicated and time consuming and can lead to errors on the part of the person performing the measurements.

The problem underlying the invention is to avoid these disadvantages in a circuit of the type initially described and to automatically correct the measured results independent of the respective adjustments of the precision calibration circuit and independent of the measuring frequency. In a circuit arrangement of the type initially described this is accomplished by coordinating the precision calibration circuit with a four-terminal attenuation networks located in the branch which does not contain the calibration circuit, whose attenuation characteristic corresponds to the attenuation characteristic of the precision calibration circuit in neutral or zero position.

According to one development of the invention the attenuation quadrupole is constructed as a coaxial line and/or coaxial cable and matched to the electrical length of the precision calibration circuit.

The invention is explained in detail with the aid of the following practical example of a preferred embodiment illustrated in the drawing, wherein like reference characters indicate like or corresponding parts, and in which:

FIG. 1 is a schematic diagram of a circuit arrangement according to the invention, for measuring attenuation;

FIG. 2 is a schematic diagram of a circuit arrangement according to the invention for measuring amplification; and FIG. 3 is a top view of a measuring device, with the cover removed, illustrating the mechanical construction of a precision calibration circuit according to the invention.

Referring to FIG. 1, a signal generator 1, which produces a measuring voltage of adjustable frequency and constant amplitude, is capable of being alternately connected by a throwover switch 2 to a measuring branch 3 containing the object X to be measured or to a comparison branch 4. The object X to be measured comprises a four-terminal network whose operating attenuation aX is to be determined. The comparison branch contains a precision calibration circuit composed of several stages 5, 6, 7 which are arranged in series relative to one another, whose adjustable at attenuation $a_{N1}$, $a_{N2}$, and $a_{N3}$ (arranged in stepwise fashion) adds up to a desired cumulative attenuation. A voltmeter 9 is connected simultaneously with the generator 1 to either one of the two branches 3 or 4 by means of a throwover switch 8, which is suitable coupled with the throwover switch 2. A fixed four-terminal attenuation network 10 is connected in series to the object to be measured, whose frequency-sensitive attenuation component $a_K$ corresponds to the corresponding attenuation of the series connected stages 5, 6, and 7 in neutral attenuation position, that is to say at zero setting of the cumulative attenuation.

The four-terminal attenuation network 10 may be suitably constructed as a network of resistances and reactances when used in measuring circuits operated in the low frequency range, while in circuits which are operated in the higher frequency ranges it is preferably constructed as a coaxial line or coaxial cable. In this case it is advantageous that the damping characteristic of a precision calibration circuit operated at higher frequencies corresponds in principle to the attenuation characteristic of a coaxial line or coaxial cable so that a proper dimensioning of the circuit attenuation can be achieved merely by so proportioning the length of the coaxial line that its attenuation characteristic corresponds to the attenuation characteristic of the precision calibration circuit in neutral attenuation position.

It is furthermore possible to produce the four-terminal attenuation network by combining an unloaded coaxial line with a dissipative coaxial line or with a coaxial cable, whereby the dimensions of the coaxial components are so selected that in addition to the attenuation characteristic of the precision calibration circuit, its electrical length is also simultaneously reproduced so that the output voltages of the branches 3 and 4 are in phase. In this manner these voltages can be carried together in proper phase relation, which is of particular importance for the operating example above-described, wherein the branches 3 and 4 are connected in parallel to the signal generator 1 and to the voltmeter 9, whereby the voltage differential of both output voltages is measured.

In effecting the measuring process with the aid of the circuit arrangement shown in FIG. 1, the switches 2 and 8 are first brought into the lower switching position so that the measuring branch 3 is connected, and the indication on the voltmeter 9 is observed. Then, after changing over switches 2 and 8 into the upper switching position, the four-terminal attenuation networks of the stages 5, 6, and 7 of the precision calibration circuit are connected which produce a cumulative attenuation corresponding to the four-terminal network measurement aX of the object X to be measured. Attenuation identity in both branches is thereby indicated by identity of the measured values on the voltmeter 9. The adjusted values of the connected attenuation values $a_{N1}$, $a_{N2}$ and $a_{N3}$ of the precision calibration circuit then represent an accurate measurement of the four-terminal attenuation network 10, the corrections of the measuring results required by the inherent attenuation of the precision calibration circuit are automatically taken into account in the measuring process.

The circuit arrangement illustrated in FIG. 2, enables a measurement of the amplification $v_X$ of an amplifying four-terminal network and for the greater part consists of the same circuit components as illustrated in FIG. 1 and therefore carry the same reference numerals. Here, the object X to be measured is inserted into the branch containing the precision calibration circuit 5, 6 and 7. Consequently, this branch is designated as the measuring branch 11, while the comparison branch 12 now contains only the four-terminal attenuation network 10. Here, too, the adjustment of the individual stages of the precision calibration circuit 5, 6, and 7 for identical output voltages in the branches 11 and 12 directly designates the amplification $v_x$ to be determined, without further corrective measures.

FIG. 3 illustrates a preferred embodiment of the precision calibration circuit employed according to the invention which with a coaxial construction can be used to good advantage for higher frequency ranges. The four-terminal attenuation network 10 in FIGS. 1 and 2 is here constructed as a coaxial line and permanently incorporated within the equipment housing of the calibration circuit. From the coaxial connectors 14 and 15 mounted on the front plate 13 of the apparatus there extend bent coaxial lines 16 and 17 to the schematically illustrated attenuation stages 5, 6, and 7, which in each case may comprise a group of staged cylindrically arranged damping four-terminal network. By means of radially disposed rotatable switch contacts, which are not shown in detail and which are arranged in circular paths 18, 19, 20 and 21 within planes extending perpendicularly to the axis of the hollow conductors 16 and 17, the electrical connection may be effected between the inner conductor of the coaxial line 16 or 17 and the attenuation members of the calibration circuits 5, 6, and 7, whereby the adjustments of the radial switch blades is carried out in circumferential direction and, as a result, a single four-terminal attenuation network may be selected within the stages 5, 6, and 7 by means of respective control knobs 22, 23, and 24.

The connecting leads of the four-terminal attenuation network 10, constructed as a coaxial line are designated by reference numerals 25 and 26. From these connecting leads originate coaxially disposed line sections 27 and 28 which are connected to coaxial conductors 31 and 32 by conduit ells 29 and 30. Connected therewith by other conduit ells 33 and 34 are two coaxial conductors 35 and 36 which are connected to each other in U-shaped formation by the connection piece 37, thus forming a continuous multibent coaxial line comprising the serially connected parts 25, 27, 29, 31, 33, 35, 37, 36, 34, 32, 30, 28 and 26. The coaxial conductors 35 and 36, in contrast to the others, are constructed from portions of a coaxial line of silver-coated brass provided with an inner conductor of tin bronze in order to so increase the transmission loss at equal electrical lengths between the connecting leads 25 and 26 and the connecting leads 14 and 15 that the inherent attenuation of the precision calibration circuit is very precisely reproduced by the coaxial line. An exceptionally good stability and electrical sealing of the entire arrangement is accomplished by the construction above-described.

I claim:

1. A circuit for measuring transmission through a four-terminal network comprising, in combination: a measuring branch having terminals for connection to the four-terminal network under test; and a comparison branch; the branches being adapted at one end for operative connection to a signal generator having a measuring voltage of constant amplitude and being adapted at their other end for operative connection to a voltage measuring device; one of the branches having a precision calibration circuit including a plurality of four-terminal attenuator networks whose attenuation values are graduated with respect to one another and switch means for selectively connecting said plurality of networks in circuit; the other of said branches having a fixed valued attenuation means in the form of a coaxial line whose attenuation characteristic, responsive to the measuring frequency, corresponds to the attenuation characteristic of the precision calibration circuit in the zero attenuation position.

2. A circuit arrangement according to claim 1, wherein the electrical length of said coaxial line is matched to the electrical length of the precision calibration circuit.

3. A circuit arrangement according to claim 2, wherein said coaxial line is constructed as a coaxial cable.

4. A circuit arrangement according to claim 2, wherein the inner conductor of the coaxial line consists at least partially of a material having a greater electrical resistance than other portions of the coaxial line.

5. A circuit arrangement according to claim 4, wherein the inner conductor of the coaxial line is of a tin-bronze.